(12) United States Patent
Dandra et al.

(10) Patent No.: US 9,712,983 B2
(45) Date of Patent: Jul. 18, 2017

(54) METHOD AND SYSTEM FOR OPTIMIZED SCANNING IN MOBILE COMMUNICATION TERMINAL WITH SINGLE/MULTI SIM CARDS WITH SINGLE RF

(71) Applicant: Samsung Electronics Co., Ltd., Gyeonggi-do (KR)

(72) Inventors: Prasad Basavaraj Dandra, Bangalore (IN); Pavan Kumar Devarayanigari, Bangalore (IN); Ravi Krishna Hari Haran Sripada, Bangalore (IN); Vijay Ganesh Surisetty, Bangalore (IN); Nitesh Pushpak Shah, Bangalore (IN); Jaya Prakash Sivapuram, Bangalore (IN)

(73) Assignee: Samsung Electronics Co., Ltd (KR)

( * ) Notice: Subject to any disclaimer, the term of this patent is extended or adjusted under 35 U.S.C. 154(b) by 154 days.

(21) Appl. No.: 14/678,157

(22) Filed: Apr. 3, 2015

(65) Prior Publication Data
US 2015/0289114 A1 Oct. 8, 2015

Related U.S. Application Data

(60) Provisional application No. 61/974,743, filed on Apr. 3, 2014.

(30) Foreign Application Priority Data

Feb. 11, 2015 (KR) ......................... 10-2015-0020859

(51) Int. Cl.
*H04L 12/28* (2006.01)
*H04W 4/08* (2009.01)
(Continued)

(52) U.S. Cl.
CPC ............. *H04W 4/08* (2013.01); *H04W 48/16* (2013.01); *H04W 76/002* (2013.01); *H04W 48/18* (2013.01)

(58) Field of Classification Search
CPC ..... H04W 4/08; H04W 76/002; H04W 48/16; H04W 48/18
See application file for complete search history.

(56) References Cited

U.S. PATENT DOCUMENTS

| 8,543,109 B2* | 9/2013 | Kim | H04W 60/005 455/435.1 |
| 8,874,083 B2* | 10/2014 | Adjakple | H04W 4/08 455/411 |

(Continued)

*Primary Examiner* — Robert Wilson
(74) *Attorney, Agent, or Firm* — The Farrell Law Firm, P.C.

(57) ABSTRACT

A method and user equipment for handling a Public Land Mobile Network (PLMN) selection in a mobile communication network is provided. The method includes obtaining, by a User Equipment (UE), a PLMN list of one or more Radio Access Technologies (RATs) comprising a list of available PLMNs, when the UE performs a Manual Closed Subscriber Group (CSG) selection, initiating a PLMN list validation timer, and reusing the previously obtained PLMN list, when at least one predefined event is triggered and the PLMN list validation timer is running. The at least one predefined event comprises at least one of Home Public Land Mobile Network (HPLMN) timer expiration, a manual PLMN selection, the manual CSG selection, and autonomous CSG selection.

20 Claims, 11 Drawing Sheets

(51) Int. Cl.
    *H04W 48/16*     (2009.01)
    *H04W 76/00*     (2009.01)
    *H04W 48/18*     (2009.01)

(56) References Cited

U.S. PATENT DOCUMENTS

| | | | |
|---|---|---|---|
| 2012/0033679 A1* | 2/2012 | Horn | H04W 48/10 370/401 |
| 2012/0157095 A1* | 6/2012 | Fodor | H04W 4/08 455/434 |
| 2012/0218889 A1* | 8/2012 | Watfa | H04W 60/04 370/230 |
| 2013/0288680 A1 | 10/2013 | Rysgaard | |
| 2015/0289114 A1* | 10/2015 | Dandra | H04W 4/08 370/329 |
| 2016/0242138 A1* | 8/2016 | Basavaraj | H04W 48/20 |

* cited by examiner

| SI NO | PLMN ID | CSG ID | HNBLen | HNBName | RAT ID | Description |
|---|---|---|---|---|---|---|
| 1 | 310 380 | 0x12345678 | 5 | Test1 | 3G | CSG Cell |
| 2 | 310 410 | 0x21345678 | 4 | Test2 | 4G | CSG Cell |
| 3 | 310 320 | N/A | N/A | N/A | 3G | Normal Cell |
| 4 | 310 330 | N/A | N/A | N/A | 4G | Normal Cell |

METHOD AND SYSTEM FOR OPTIMIZED SCANNING IN MOBILE COMMUNICATION TERMINAL WITH SINGLE/MULTI SIM CARDS WITH SINGLE RF

PRIORITY

This application claims priority under 35 U.S.C. §119(e) to U.S. Provisional Patent Application Ser. No. 61/974,473, which was filed in the United States Patent and Trademark Office on Apr. 3, 2014, and under 35 U.S.C. §119(a) to Korean Patent Application Ser. No. 10-2015-0020859, which was filed in the Korean Intellectual Property Office on Feb. 11, 2015, the entire contents of which are incorporated herein by reference.

BACKGROUND

1. Field of the Invention

The present invention generally relates to communication devices, and more particularly, to a method and system for enabling optimized scanning in a mobile communication terminal with single/multi Subscriber Identity Module (SIM) cards with single radio frequency (RF).

2. Description of the Related Art

Mobile devices are typically able to detect the presence of one or more proximate mobile stations of various types, such as public land mobile networks (PLMNs), macro cells, micro cells, femto cells, pico cells, and the like. According to the existing technologies, the mobile device performs scanning process to identify and generate a list of available networks, from where the mobile device can select one of the network with which the mobile device can connect and initiate any type of mobile communication process. For example, PLMN list scanning can be conducted to generate a list of nearby PLMNs, Home PLMN (HPLMN)s, and closed subscriber groups (CSGs) or femto cells to the mobile device. The list generated by the PLMN list scan can be helpful during a PLMN selection, a HPLMN selection or a CSG selection.

According to existing technologies, if the PLMN list scan is performed during PLMN selection/HPLMN selection/CSG selection procedures, and any other scenario of manual PLMN selection/HPLMN selection/CSG selection procedures is immediately initiated, then the complete PLMN scan will be reinitiated. This situation arises usually in certain scenarios, such as when the user is in motion and moving from range of one mobile station to another, when the user is using a mobile device with dual or multi SIM cards, and the like. When the UE or mobile device has multiple/dual SIM cards with single radio frequency (RF) for performing the PLMN list scan, the RF has to be shared for a scanning operation on each SIM related operator. At this time, if any paging is received on another SIM, then the newly received paging will be missed. Thus, for each SIM present in the user equipment (UE), PLMN list scanning has to be performed separately, and therefore, each scanning operation for each SIM will increase the time taken to scan for the complete PLMN list. Further, a scanning operation for each SIM will consume more battery power.

The PLMN list acquisition procedures for different scenarios are described as below.

HPLMN timer expiration: The UE scans and generates a PLMN list after every HPLMN timer expiration, if UE is registered on the Visited PLMN (VPLMN). In the case of HPLMN timer expiration, the UE acquires a list of all available PLMNs from all the radio access technologies (RATs) depending on the mode of operation, such as, single mode, dual mode, tri mode, multi-mode, and the like, of the UE, based on the number of SIM present in the UE.

FIG. 1 is a flowchart illustrating an example for the HPLMN timer expiration procedure, according to the prior art. At step 102, the UE checks whether the HPLMN timer is expired. If the timer is expired, then the procedure proceeds to step 104, step 106, or step 108. At step 104, the UE checks whether the operating mode of the UE is a single mode comprising a single SIM. If the operating mode of the UE is a single mode, then at step 110, a list of all available PLMNs with respect to the respective RAT is acquired.

At step 106, the UE checks whether the operating mode of the UE is a double mode. If the operating mode of the UE is a double mode, then at step 112, a list of all available PLMNs with respect to the two respective RATs are acquired. At step 108, the UE checks whether the operating mode of the UE is a multi-mode (e.g., tri mode comprising three SIMs). If the operating mode of the UE is a multi-mode (e.g., tri mode), then at step 114, a list of all available PLMNs with respect to all (e.g., three) respective RATs are acquired.

Manual PLMN selection: Similar to the HPLMN timer expiration, for the manual PLMN selection procedure, a list of all available PLMNs has to be acquired from all RATs depending on the mode of operation, such as single mode, dual mode, tri mode, multi-mode, and the like, of the UE, based on the number of SIMs present in the UE.

FIG. 2 is a flowchart illustrating an example for the manual PLMN selection procedure, according to the prior art. At step 202, the UE checks whether the selection procedure is a manual PLMN selection procedure. If the selection procedure is a manual PLMN selection procedure, then the procedure proceeds to step 204, step 206, or step 208. At step 204, the UE checks whether the operating mode of the UE is a single mode operation involving a single SIM. If the operating mode of the UE is a single mode, then at step 210, a list of all available PLMNs with respect to the respective RAT is acquired.

At step 206, the UE checks whether the operating mode of the UE is a dual mode. If the operating mode of the UE is a dual mode, then at step 212, a list of all available PLMNs with respect to the two respective RATs are acquired. At step 208, the UE checks whether the operating mode of the UE is a multi mode (e.g., tri mode). If the operating mode of the UE is a multi mode (e.g., tri mode), then at step 214, a list of all available PLMNs with respect to all (e.g., three) respective RATs are acquired.

Periodic CSG selection: For the periodic CSG selection procedure, a list of all available PLMNs for CSG cells is acquired from all RATs depending on the mode of operation, such as, a single mode, a dual mode, a tri mode, a multi-mode, and the like, of the UE, based on the number of SIM present in the UE. Here, the acquired RATs exclude 2G RATs.

FIG. 3 is a flowchart illustrating an example for the periodic CSG selection procedure, according to the prior art. At step 302, the UE checks whether the selection procedure is a periodic CSG selection procedure. If the selection procedure is a periodic CSG selection procedure, then the procedure proceeds to step 304, step 306, or step 308. At step 304, the UE checks whether the operating mode of the UE is a single mode comprising a single SIM. If the operating mode of the UE is a single mode, then at step 310, a list of all available PLMNs with respect to the respective RAT, excluding 2G RATs, is acquired. At step 306, the UE checks whether the operating mode of the UE is a dual mode. If the operating mode of the UE is a dual mode, then at step 312, a list of all available PLMNs with respect to the two respective RATs, excluding 2G RATs, are acquired. At step 308, the UE checks whether the operating mode of the UE is a multi mode (e.g., tri mode). If the operating mode of the UE is a multi mode (e.g., tri mode), then at step 314, a list of all available PLMNs with respect to all (e.g., three) respective RATs, excluding 2G RATs, are acquired.

Based on the above-mentioned procedures, problems in different scenarios are identified in the description of how the manual periodic CSG selection along with any of the PLMN selection, the HPLMN timer expiration, and the periodic CSG selection are implemented in a short interval of time.

FIG. 4 is a flow diagram illustrating a problem in a scenario identified for a list acquisition procedure for periodic CSG timer expiration and HPLMN timer expiration, according to the prior art. FIG. 4 describes an interaction between Access Stratum (AS) 404 and Non Access Stratum (NAS) 402 in a multi-mode UE for generation and acquisition of a PLMN list. When a periodic CSG timer is expired at the NAS 402, then CSG search is initiated to get the available list of CSG IDentities (IDs) along with the PLMNs on all supported RATs (4G, 3G) by sending START_LIST_REQ to the AS 404. The AS 404 performs the scanning procedure and provides the CSG—Associated PLMN list in 4G and 3G RATs by sending LIST_IND to the NAS 402.

Assuming, an HPLMN timer expires immediately, NAS 402 again sends START_LIST_REQ to the AS 404 to acquire a list of all PLMNs for 4G, 3G and 2G RATs. Even though NAS 402 already has the list of available PLMNs which were acquired recently on 4G and 3G along with the CSG IDs (for the CSG cell), NAS 402 does not use the present PLMN list, but instead sends the request START_LIST_REQ for PLMN list again to get the corresponding list of available PLMNs from all RATs on 4G, 3G, and 2G. As the AS 404 again starts scanning procedures in 4G and 3G RATs, there will be a delay in acquiring the PLMN list, and thereby consuming more battery power. A similar problem can be observed when the PLMN list acquired due to the periodic CSG timer expiration and the manual PLMN selection is immediately triggered.

FIG. 5 is a flow diagram illustrating a problem in a scenario identified for a list acquisition procedure on two SIMs, when two SIMs with single RF have 4G and 3G RATs in common, according to the prior art. FIG. 5 describes an interaction between AS 504 and NAS 502 in a multi-mode UE with a dual SIM (SIM1 and SIM2), for generation and acquisition of the PLMN list. At the periodic CSG timer expiration, at the manual PLMN selection, or at the HPLMN timer expiration for SIM1, the UE needs to acquire the list of available PLMNs on SIM1. Here, SIM1 needs to acquire the PLMN list on 4G and 3G, and SIM2 needs to acquire the PLMN list on 4G, 3G, and 2G, so that both the SIM1 and SIM2 have 4G and 3G RATs in common. Upon expiration of a periodic CSG timer, the CSG search is initiated to get the available list of CSG IDs along with the PLMNs on all supported RATs on SIM1 by sending START_LIST_REQ to the AS 504. While the PLMN list request procedure is in progress at the AS 504 on SIM1, the RF will be used by SIM1.

During generation of the PLMN list on SIM1 after periodic CSG timer expiration, the HPLMN timer on SIM2 can expire. As the RF of the UE is being occupied by the SIM1, the UE has to wait until the release of the RF for sending a request for another PLMN list. The AS 504 generates the PLMN list on SIM1 and sends the LIST_IND on SIM1 to the NAS 502. Upon receiving the PLMN list, the RF is released by SIM1 for the use by SIM2. The SIM2 of the UE uses the RF channel and sends the START_LIST_REQ for acquiring a list of available PLMNs as part of the HPLMN timer expiration actions on all supported RATs of 4G, 3G, and 2G.

Even though SIM1 has already performed the PLMN list acquisition recently on 4G and 3G, and the RATs for which the PLMN list is acquired are also supported by SIM2, the available list of PLMNs already being present is not utilized and the PLMN list is acquired again. This leads to a delay in acquiring the PLMN list on SIM2 from 4G and 3G, in addition to the waiting time for the RF to be released by SIM1. Further, the delay in the release of RF and repeated generation of the PLMN list lead to consumption of more battery power.

FIG. 6 is a flow diagram illustrating a problem in a scenario identified for a list acquisition procedure on two SIMs with single RF, when two SIMs have 4G and 3G RATs in common, according to the prior art. FIG. 6 describes an interaction between AS 604 and NAS 602 in a multi-mode UE for generation and acquisition of a PLMN list. At the periodic CSG timer expiration, at the manual PLMN selection, or at the HPLMN timer expiration for SIM1, the UE needs to acquire the list of available PLMNs on SIM1. Here, the PLMN list required to be acquired by both the SIM1 and SIM2 are the same. Upon expiration of a periodic CSG timer, the CSG search is initiated to get the available list of CSG IDs along with the PLMNs on all supported RATs on SIM1 by sending START_LIST_REQ to the AS 604. While the PLMN list request procedure is in progress on SIM1, the RF will be used by SIM1.

During generation of the PLMN list on SIM1 after the periodic CSG Timer expiration, the periodic CSG Timer on SIM2 can expire. As the RF of the UE is being occupied by the SIM1, the UE has to wait until the release of the RF for sending request for another PLMN list. The AS 604 generates the PLMN list on SIM1 and sends the LIST_IND on SIM1 to the NAS 602. Upon receiving the PLMN list, the RF is released by SIM1 for the use by SIM2. The SIM2 of the UE uses the RF channel and sends the START_LIST_REQ for acquiring a list of available PLMNs as part of the periodic CSG timer expiration actions on all supported RATs.

Even though SIM1 has already performed the PLMN list acquisition recently on 4G and 3G, and the RATs for which the PLMN list is acquired are also supported by SIM2, the available list of PLMNs already being present is not utilized and the PLMN list is acquired again. This leads to a delay in acquiring the PLMN list on SIM2 from 4G and 3G, in addition to the waiting time for the RF to be released by SIM1. Further, the delay in the release of the RF and repeated generation of the PLMN list lead to consumption of more battery power.

The above-mentioned problems in different scenarios of the HPLMN timer expiration, the manual PLMN selection, and the periodic CSG selection are observed during the PLMN list acquisition in 3GPP based systems. The existing methodologies do not address the use of an existing PLMN list before the expiration of an HPLMN timer, and also do not address reducing battery power by reusing the same PLMN list before the expiration of the HPLMN timer.

Thus, there is a need of an effective method and system for optimized scanning in a mobile communication terminal to overcome the problems discussed above.

SUMMARY

The present invention has been made to address at least the above mentioned problems and/or disadvantages and to provide at least advantages described below. Accordingly, an aspect of the present invention is to provide a method and system for handling a Public Land Mobile Network (PLMN) selection in a mobile communication network.

In accordance with an aspect of the present invention, a method for handling a Public Land Mobile Network (PLMN) selection in a mobile communication network is provided. The method includes obtaining, by a User Equipment (UE), a PLMN list of one or more Radio Access Technologies (RATs) comprising a list of available PLMNs, when the UE performs a manual Closed Subscriber Group (CSG) selection; initiating a PLMN list validation timer; and reusing the previously obtained PLMN list, when at least one predefined event is triggered and the PLMN list validation timer is running. The at least one predefined event comprises at least one of Home Public Land Mobile Network (HPLMN) timer expiration, a manual PLMN selection, the manual CSG selection, and an autonomous CSG selection.

In accordance with another aspect of the present invention, a user equipment for use in a mobile communication network for an enhanced PLMN selection is provided. The user equipment includes at least one means adapted to obtain a PLMN list of one or more Radio Access Technologies (RATs) comprising a list of available PLMNs, when the UE performs a manual Closed Subscriber Group (CSG) selection, to initiate a PLMN list validation timer, and to reuse the previously obtained PLMN list, when at least one predefined event is triggered and the PLMN list validation timer is running. The at least one predefined event comprises at least one of Home Public Land Mobile Network (HPLMN) timer expiration, a manual PLMN selection, the manual CSG selection, and an autonomous CSG selection.

In accordance with another aspect of the present invention, a non-transitory computer-readable medium of a User Equipment (UE), the UE including information related to a Public Land Mobile Network (PLMN) selection mode, having processor-executable instructions for an enhanced PLMN selection in a mobile communication network stored thereon, the instructions, when executed by a processor, causing the UE to perform steps is provided. The steps includes obtaining a PLMN list of one or more Radio Access Technologies (RATs) comprising a list of available PLMNs, when the UE performs a manual Closed Subscriber Group (CSG) selection, initiating a PLMN list validation timer, and reusing the previously obtained PLMN list, when at least one predefined event is triggered and the PLMN list validation timer is running. The at least one predefined event comprises at least one of Home Public Land Mobile Network (HPLMN) timer expiration, a manual PLMN selection, the manual CSG selection, and an autonomous CSG selection.

BRIEF DESCRIPTION OF THE DRAWINGS

The above and other aspects, features, and advantages of certain embodiment of the present invention will be more apparent from the following description, taken in conjunction with the accompanying drawings, in which.

DETAILED DESCRIPTION OF EMBODIMENTS OF THE PRESENT INVENTION

Figure 1:
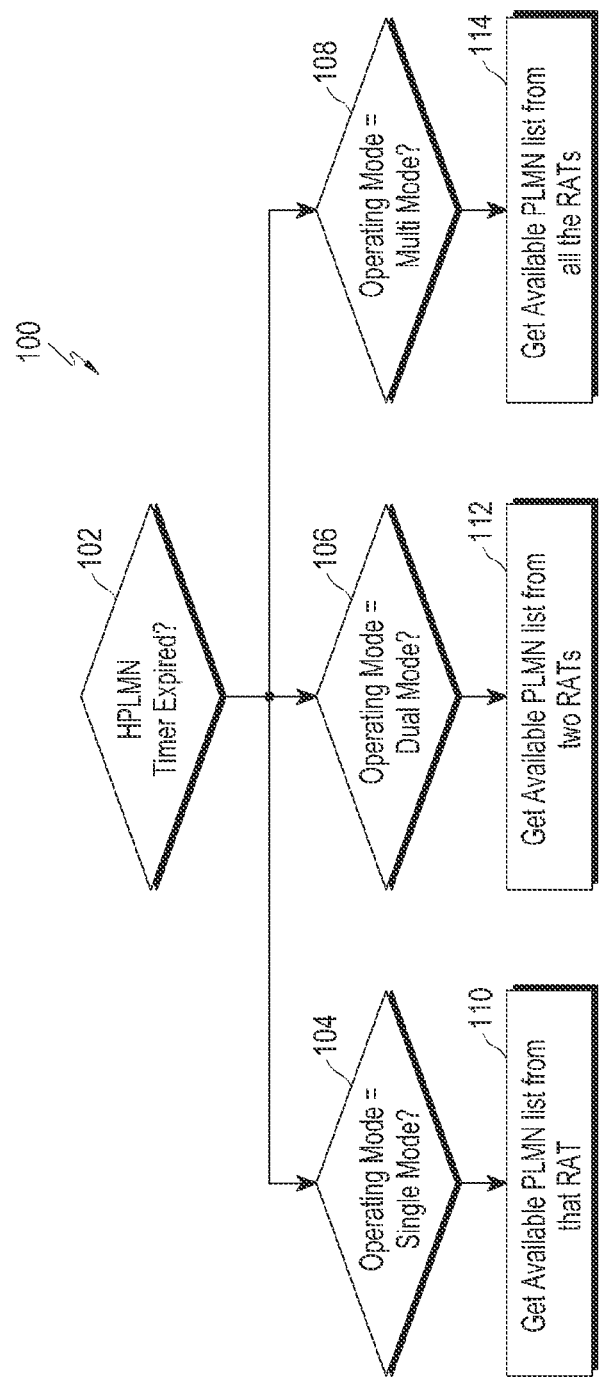
FIG. 1 is a flowchart illustrating an example for an HPLMN timer expiration procedure, according to the prior art.
Figure 2:
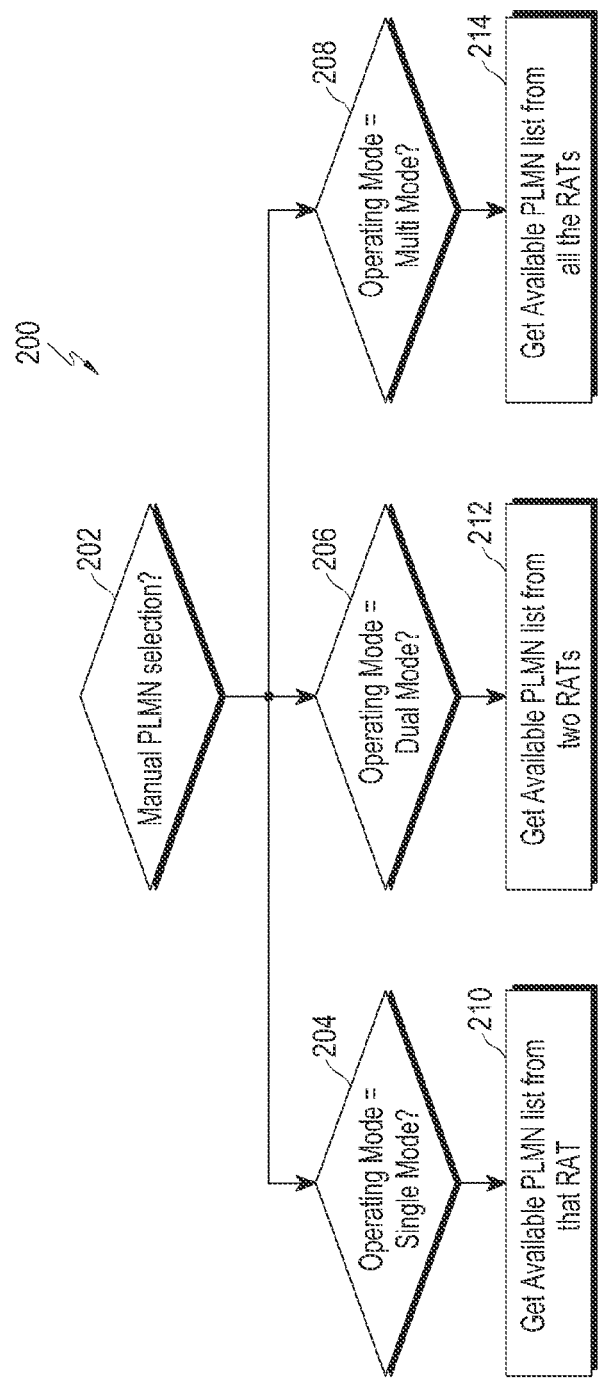
FIG. 2 is a flowchart illustrating an example for a manual PLMN selection procedure, according to the prior art.
Figure 3:
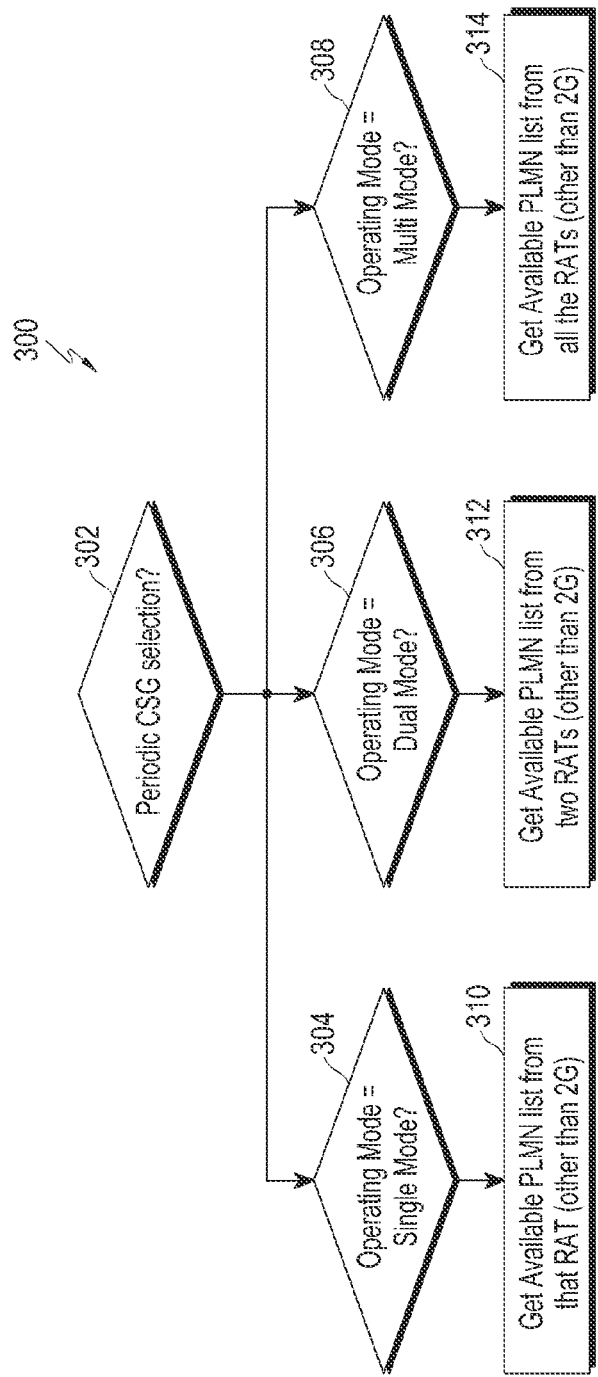
FIG. 3 is a flowchart illustrating an example for a periodic CSG selection procedure, according to the prior art.
Figure 4:
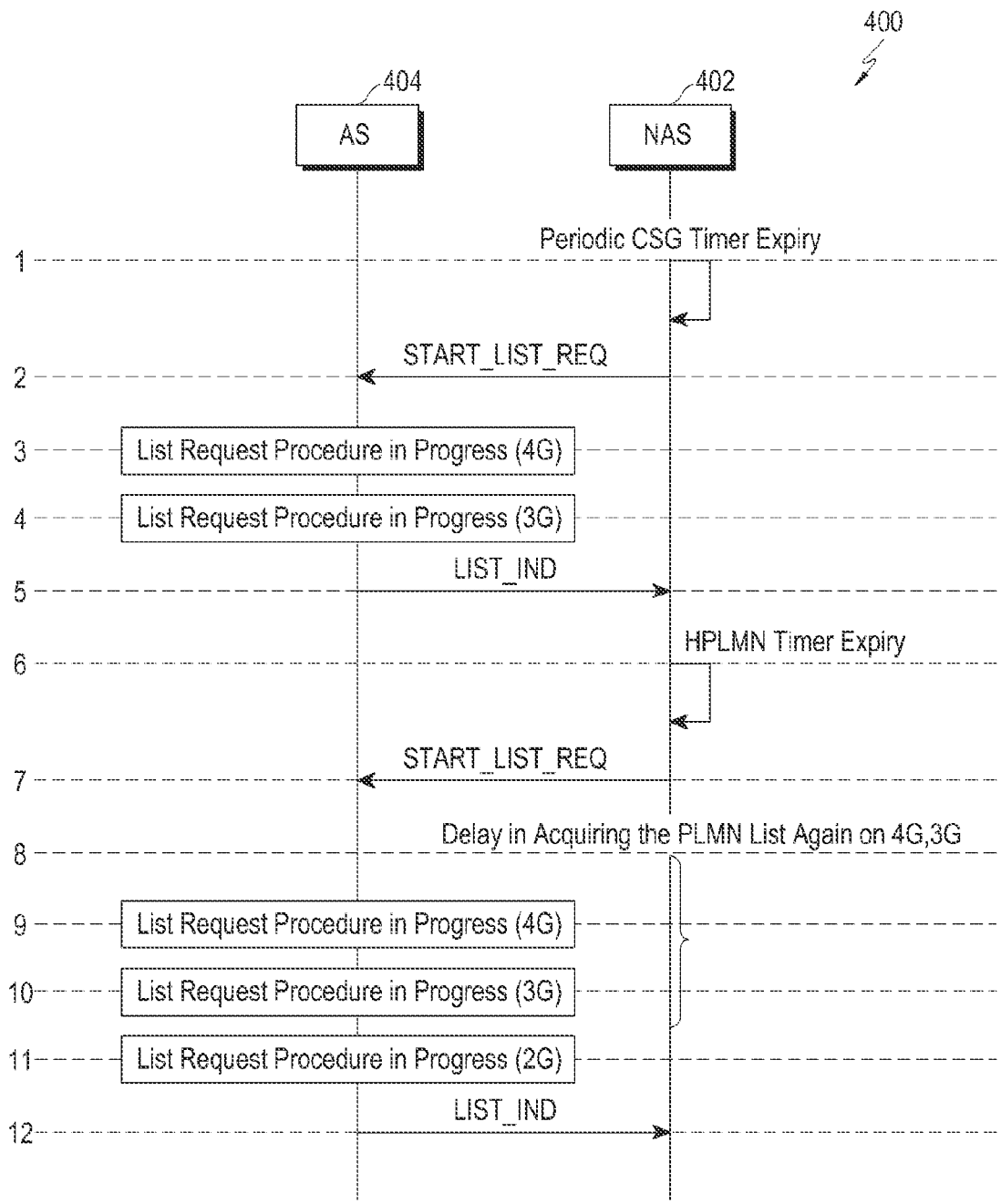
FIG. 4 is a flow diagram illustrating a problem in a scenario identified for a list acquisition procedure for periodic CSG timer expiration and HPLMN timer expiration, according to the prior art.
Figure 5:
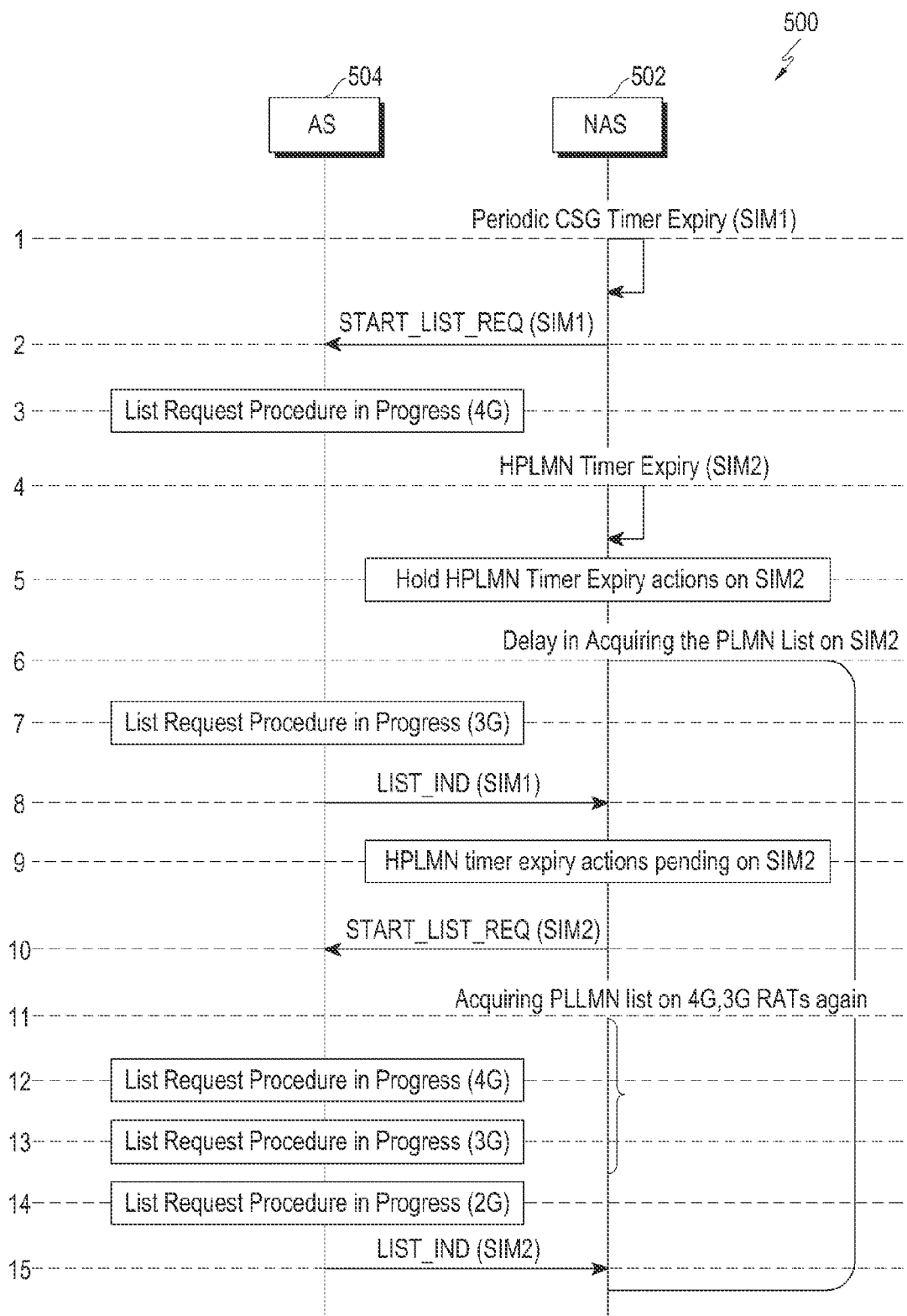
FIG. 5 is a flow diagram illustrating a problem in a scenario identified for a list acquisition procedure on two SIMs, when two SIMs with single RF have 4G and 3G RATs in common, according to the prior art.
Figure 6:
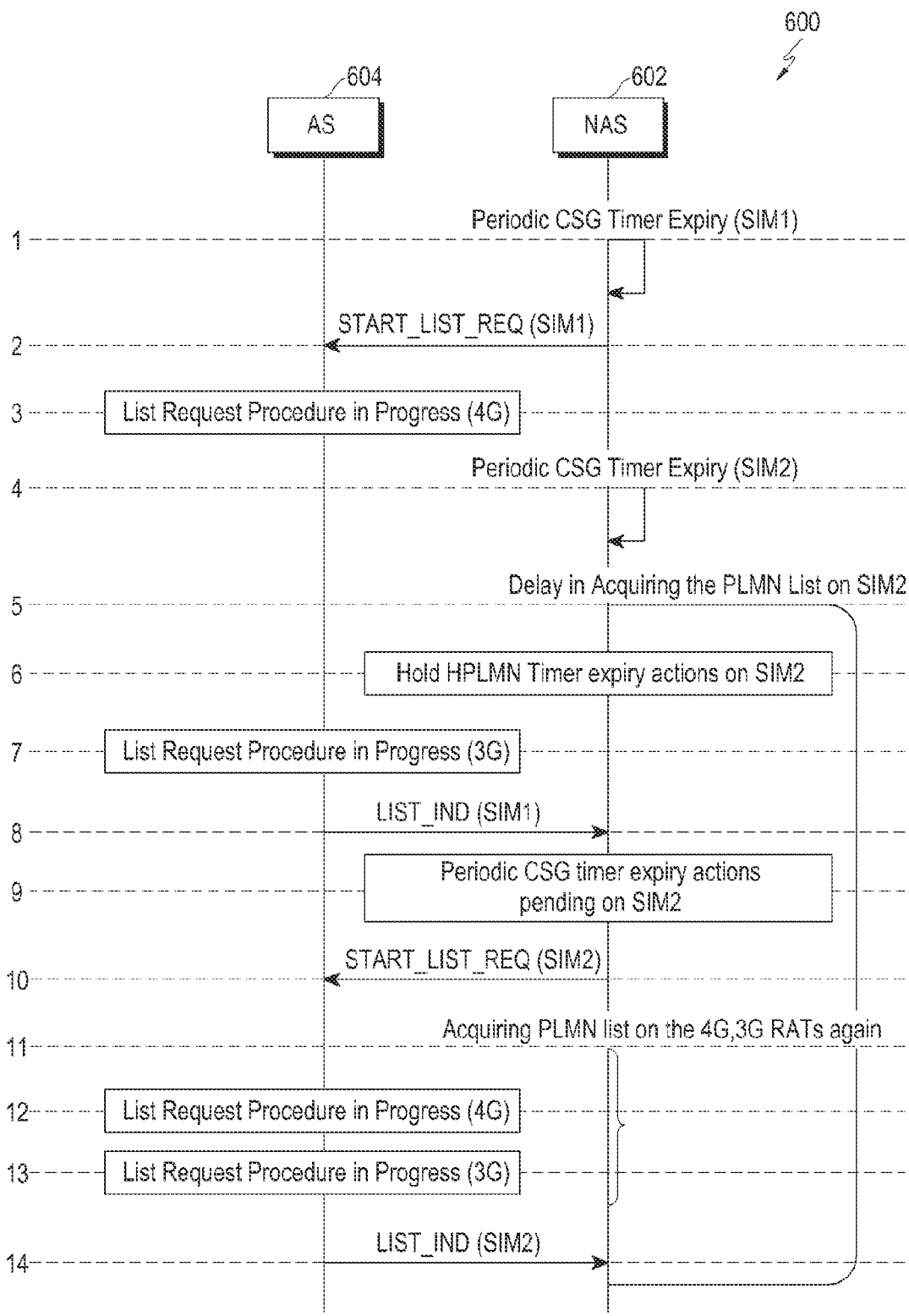
FIG. 6 is a flow diagram illustrating a problem in a scenario identified for a list acquisition procedure on two SIMs with single RF, when two SIMs have 4G and 3G RATs in common, according to the prior art.

The various embodiments of the present invention describe a method and system for optimized scanning in a mobile communication terminal with single/multi SIM cards with single RF. The present invention focuses on reducing the delay and saving battery power while acquiring PLMN lists due to various causes like the manual PLMN selection, the HPLMN timer expiration, or the CSG selection, when the PLMN list is already available from the CSG scan for single, dual and multi SIM cards with single RF on a multiple RATs supporting UE.

In the following detailed description of the embodiments of the present invention, reference is made to the accompanying drawings that form a part hereof, and in which specific embodiments, in which the present invention may be practiced, are shown by way of illustration. These embodiments are described in sufficient detail to enable those skilled in the art to practice the present invention, and it is to be understood that other embodiments may be utilized and that changes may be made without departing from the scope of the present invention. The following detailed description is, therefore, not to be taken in a limiting sense, and the scope of the present invention is defined by the appended claims and their equivalents.

The specification may refer to "an", "one" or "some" embodiment(s) in several locations. This does not necessarily imply that each such reference is to the same embodiment(s), or that the feature only applies to a single embodiment. A single feature of different embodiments may also be combined to provide other embodiments.

As used herein, the term "user equipment" ("UE") refers to mobile devices, such as mobile telephones, personal digital assistants (PDAs), handheld or laptop computers, and similar devices that have telecommunications capabilities. The terms "UE," "user device," and "user node" may be used synonymously herein. A UE might include components that allow the UE to communicate with other devices, and might also include one or more associated removable memory modules, such as a Universal Integrated Circuit Card (UICC) that includes a Subscriber Identity Module (SIM) application, a Universal Subscriber Identity Module (USIM) application, or a Removable User Identity Module (R-UIM) application, but not limited thereto. Alternatively, such a UE might consist of the device itself without such a module. In other cases, the term "UE" refers to devices that have similar capabilities but that are not transportable, such as desktop computers, set-top boxes, or network appliances. The term "UE" may also refer to any hardware or software component that can terminate a communication session for a user. Further, the UE can include more than one SIM application running together and can be called as dual SIM mobile device if the mobile comprises of two SIM applications, and similarly, multi-SIM mobile device if multiple SIM applications are running on the mobile device.

As used herein, the singular forms "a", "an" and "the" are intended to include the plural forms as well, unless expressly stated otherwise. It will be further understood that the terms "includes", "comprises", "including" and/or "comprising", when used in this specification, specify the presence of stated features, integers, steps, operations, elements, components, and/or groups, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly defined herein.

The present invention is described with an objective of reducing a time delay involved in acquiring lists again for radio access technology (RAT), and further, saving the battery power of a user equipment (UE). The present invention describes conducting scanning for the lists at Access Stratum level to acquire normal cells as well as closed subscriber groups (CSGs) or femto cells during the CSG list acquisition procedure along with their PLMN IDs, and keeping the same list valid for the duration of a list validity timer. During this time, if one of the other events occurs for acquiring a PLMN list, then the same list can be reused again. The same list can be used for dual or multi SIM cards, in which the respective RATs overlap.

The present invention discloses a method for optimized scanning in a mobile communication terminal with single/multi SIM cards with single RF, which includes the steps of acquiring a list of available PLMNs due to a CSG selection. The list further comprises CSG ID, Home Node B (HNB) Name (HNBName), HNB Length (HNBLength) for a CSG cell, and RAT info. The method further includes starting a validity timer for the acquired list. The acquired list is valid only for that particular duration.

An RAT info table is updated each time the list is acquired on all supported RATs while starting the list validity timer. Here, the RATs may be 4G and 3G. The UE maintains a table of PLMN ID, RAT info along with CSG ID, HNBLength, HNBName for the list of available PLMNs from 4G and 3G along with the description of each cell type indicating whether the cell is a normal CSG cell. The UE updates the table whenever the list is acquired on supported RATs as part of the CSG selection. The same list can be reused instead of acquiring the list again, if the list is required for any cause and if the validity timer of the list is still running, and thereby saving time to acquire the new list and saving battery power of the UE. Further, the acquired list can be configurable and can be stored in a non-volatile memory of the UE for use in the future.

In another embodiment of the present invention, the present invention can be extended for a method for optimized scanning in a mobile communication terminal with dual SIM and multi SIM cards with single RF, with supported RATs in common for both SIMs, and the method includes maintaining a table of PLMN ID, RAT info along with CSG ID, HNBLength, HNBName for the list of available PLMNs from 4G and 3G along with the Description of a normal cell as well as a CSG cell. The UE updates the table every time when the list is acquired on supported RATs (4G and 3G) for one of the SIMs. The acquired list can be configurable and can be stored in a non-volatile memory of the UE for use in the future. When the list is needed by another SIM during the list acquisition on one SIM, the same list can be shared between the two SIMs for the commonly supported RATs to save time and battery power so that a process of acquiring of the list needs not to be done for the RAT on which a list is already acquired by the one SIM.

Figure 7:
FIG. 7 is a table illustrating a list acquired by a UE during a CSG selection comprising different values according to an embodiment of the present invention.

FIG. 7 is a table illustrating a list acquired by a UE during the CSG selection comprising different values according to an embodiment of the present invention. FIG. 7 is the list acquired by the UE and received from the AS, which includes a plurality of values related to the acquired RATs. The UE receives the list that comprises parameters such as, PLMN ID, CSG ID, HNBLength (HNBLen), HNBName, RAT ID, Description, and the like, but is not limited thereto. RAT ID indicates the type of the RAT. In an embodiment of the present invention, the RAT ID is 3G. In another embodiment of the present invention, the RAT ID is 4G. Description illustrates the type of the cell, and whether the cell is a normal cell or a CSG cell. The parameters can be helpful to identify each PLMN acquired in the list easily and quickly. Here, these parameters may be referred to as PLMN related information, which indicates that the UE to initiate one of a manual CSG search, an autonomous CSG search, a manual PLMN search, and a high priority PLMN search.

For example, the Serial No. 1 in the table indicates that the acquired PLMN has PLMN ID as 310380, CSG ID as 0x12345678, HNBLen as 5, HNBName as Test1, RAT ID as 3G, and Description as CSG cell. The Serial No. 2 in the table 700 indicates that the acquired PLMN has PLMN ID as 310410, CSG ID as 0x21345678, HNBLen as 4, HNBName as Test2, RAT ID as 4G, and Description as CSG cell.

Figure 8:
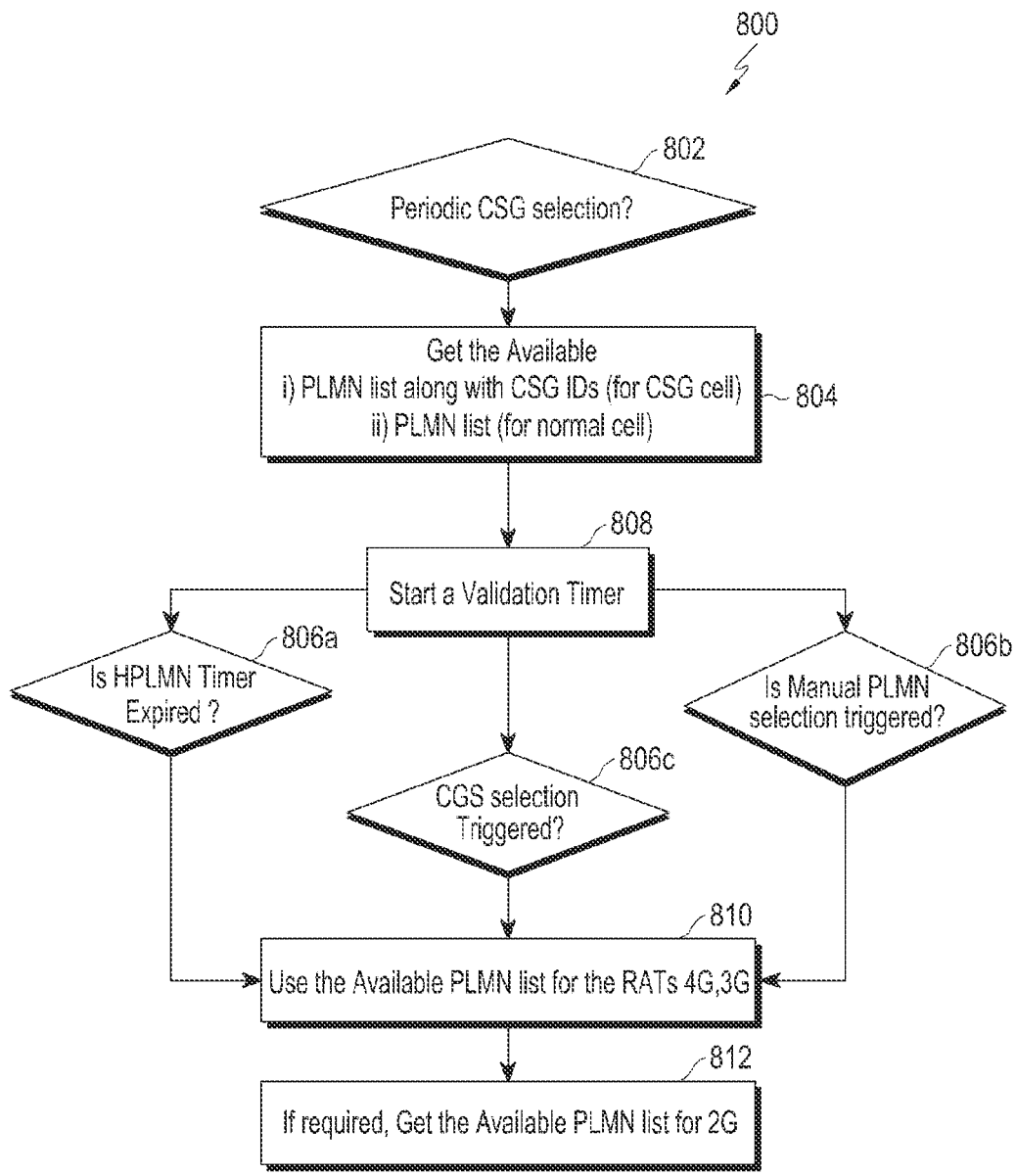
FIG. 8 is a flowchart illustrating a method for optimized scanning in a mobile communication terminal with single/multi SIM cards with single RF, according to an embodiment of the present invention.

FIG. 8 is a flowchart illustrating a method for optimized scanning in a mobile communication terminal with single/multi SIM cards with single RF, according to an embodiment of the present invention. At step 802, the mobile communication terminal verifies whether a periodic CSG selection is being initiated by the UE. At step 804, the mobile communication terminal obtains the available PLMN list along with CSG IDs for a CSG cell and a PLMN list for a normal cell, if the UE has initiated a CSG selection.

At step 808, the mobile communication terminal initiates a PLMN list validation timer, during at least one of predefined events such as HPLMN timer expiration, triggering of a Manual PLMN selection, and triggering of a manual CSG selection. At step 806a, the mobile communication terminal determines whether an HPLMN timer has expired; at step 806b, the mobile communication terminal determines whether a Manual PLMN selection is triggered; at step 806c, the mobile communication terminal determines whether a manual CSG selection is triggered. Although not illustrated, the predefined event may further include triggering of an autonomous CSG selection. If at least one of the predefined events is triggered, the mobile communication terminal then reuses the available PLMN list for one or more RATs such as 4G and 3G at step 810. At step 812, the mobile communication terminal obtains the PLMN list for 2G based on the requirements of the UE.

Figure 9:
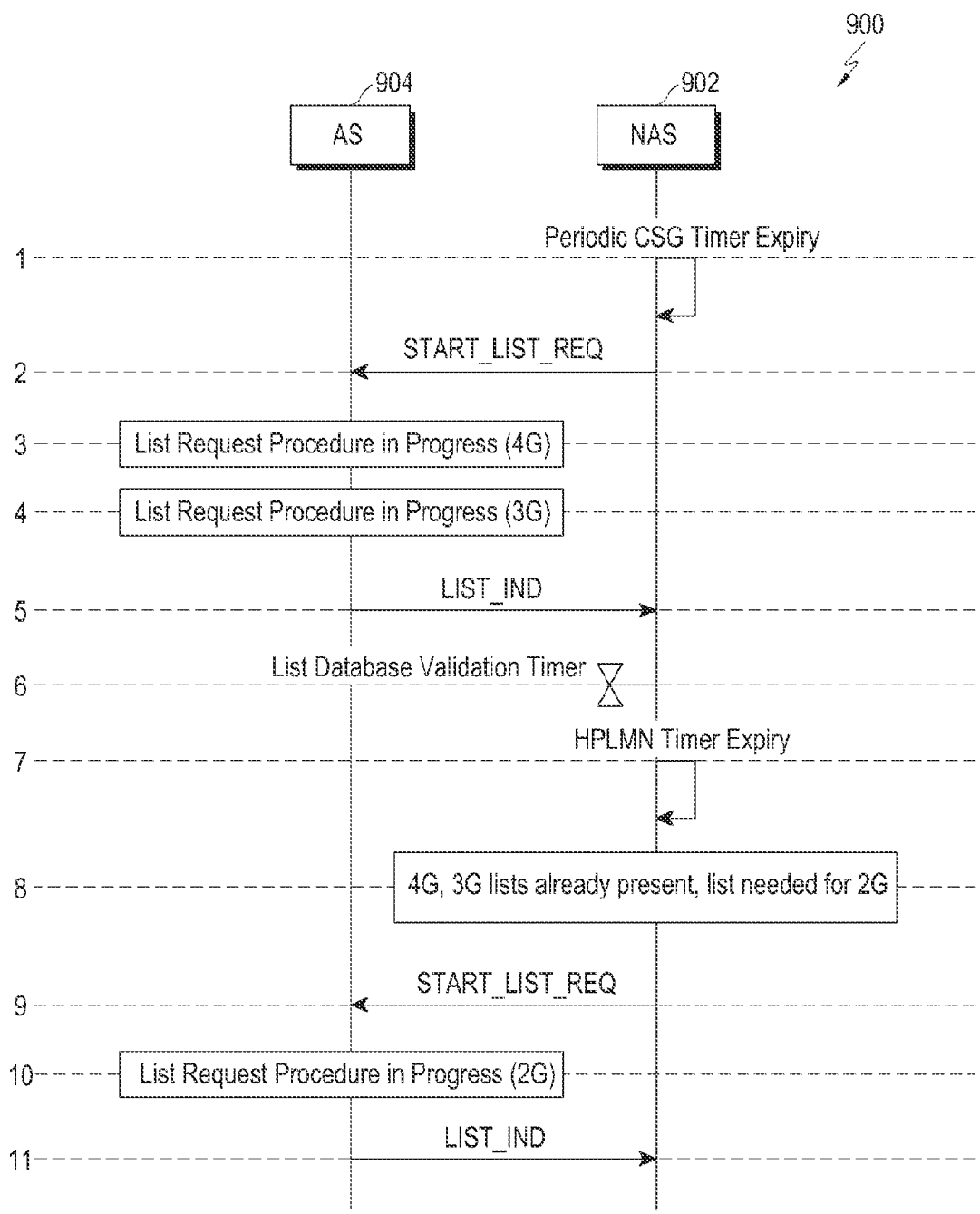
FIG. 9 is a flow diagram illustrating an example of solution for a problem in a scenario of a list reuse procedure for periodic CSG timer expiration and HPLMN timer expiration, according to an embodiment of the present invention.

FIG. 9 is a flow diagram illustrating an example of a solution for a problem in a scenario of a list reuse procedure for periodic CSG timer expiration and HPLMN timer expiration, according to an embodiment of the present invention. FIG. 9 describes an interaction between NAS 902 and AS 904 in a multi-mode UE for generation and acquisition of a PLMN list. When a periodic CSG timer is expired, then the CSG search is initiated to get the available list of CSG IDs along with the PLMNs on all supported 4G and 3G RATs by sending START_LIST_REQ to the AS 904. The AS 904 performs a scan procedure on the supported frequencies, generates a requested list for 4G and 3G, and sends the generated LIST_IND to the NAS 902.

Once NAS 902 receives the PLMN list, the UE creates a database as described in FIG. 7, which includes PLMN ID, CSG ID, HNBLen, HNBName, RAT ID, and Description, and starts a list validation timer each time the PLMN list is acquired as part of the CSG search from all the supported 4G and 3G RATs. During the running of the validation timer, if the event, HPLMN timer expiration, is triggered, then the new event of HPLMN timer expiration requires the new PLMN list. But instead of acquiring the PLMN list again, the same PLMN list is reused for the 4G and 3G RATs. In an embodiment of the present invention, the other events that can be triggered during running of the validation timer may be a manual PLMN selection and a periodic CSG selection.

The present approach may be extended for a dual SIM cards UE in which the PLMN list acquired on one SIM for the 4G and 3G RATs can be shared with another SIM to reduce the delay subject to the occurrence of the events within the expiration of a list validation timer. If another SIM needs to acquire the PLMN list from the 4G, 3G and 2G RATs, the other SIM reuses the lists for 4G and 3G RATs as the validation timer is still running, but does not have the PLMN list for 2G RAT. Therefore, the UE sends START_LIST_REQ to the AS 904 for acquiring the available list of PLMNs only for the 2G RAT. Upon receiving the request, the AS 904 scans the supported frequencies, acquires the requested list for 2G RAT, and sends the generated LIST_IND to the NAS 902.

As the PLMN list is acquired from 4G and 3G on one SIM due to the periodic CSG timer being expired, the PLMN list is reused by another SIM, when an HPLMN timer is expired. The other SIM finds that the PLMN list is not available for 2G, and hence, triggers a PLMN list request procedure only for 2G RAT, and thereby saves time required for acquiring PLMN list and saves batter power of the UE.

Figure 10:
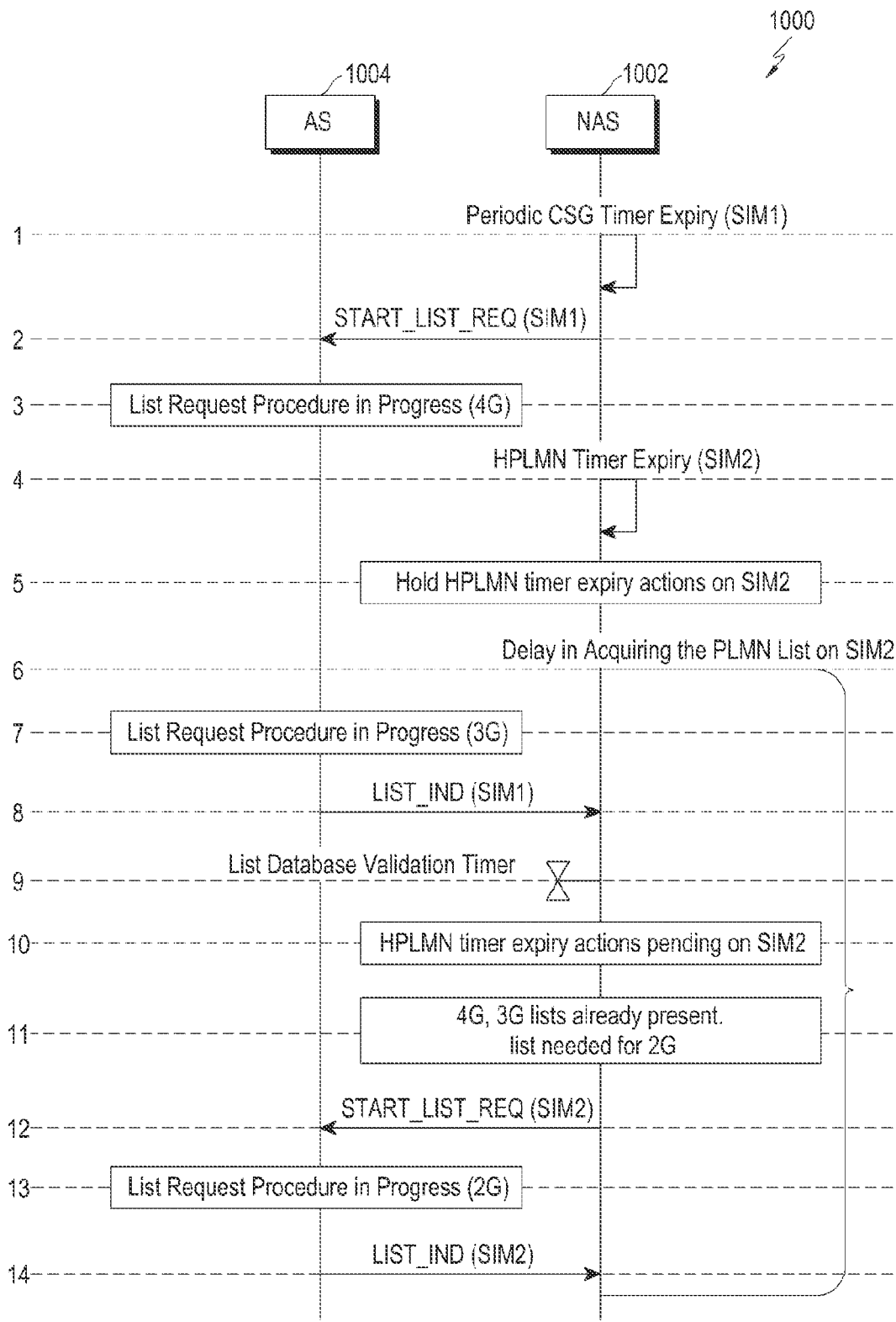
FIG. 10 is a flow diagram illustrating an example of a solution for a problem in a scenario of a list sharing procedure when two SIMs with single RF have 4G and 3G RATs in common, according to an embodiment of the present invention.

FIG. 10 is a flow diagram illustrating an example of a solution for a problem in a scenario of a list sharing procedure when two SIMs with single RF have 4G and 3G RATs in common, according to an embodiment of the present invention. FIG. 10 describes an interaction between NAS 1002 and AS 1004 in a multi-mode dual SIM UE that includes SIM1 and SIM2 for generation and acquisition of a PLMN list. Here, SIM1 acquires the PLMN list on 4G and 3G RATs, and SIM2 acquires the PLMN list on 4G, 3G and 2G RATs, so that both the SIM1 and SIM2 have 4G and 3G RATs in common. When a periodic CSG timer is expired at SIM1 of the UE, the CSG search is initiated to get the available list of CSG IDs along with the PLMNs on all supported 4G and 3G RATs by sending START_LIST_REQ to the AS 1004. The AS 1004 performs the scan procedure on all supported frequencies and provides the list for 4G and 3G separately. While the PLMN list request procedure is in progress on SIM1, the RF will be used by the SIM1.

During this time, the PLMN list acquisition procedure needs to be started on SIM2 due to the event of HPLMN timer expiration. But as the RF is still occupied by the SIM1, SIM2 needs to wait until the SIM1 releases the RF to scan again for the available list of PLMNs. In another embodiment of the present invention, the other events for starting another PLMN list acquisition procedure may be a manual PLMN selection and a periodic CSG selection.

Once the PLMN list is received on SIM1, the UE creates a database as described in FIG. 7, which includes PLMN ID, CSG ID, HNBLen, HNBName, RAT ID, and Description, and starts a list validation timer each time the PLMN list is acquired as part of the CSG search for all the supported 4G and 3G RATs. The PLMN list acquisition procedure is completed on SIM1, and the RF is released by the SIM1. Since both the SIM1 and the SIM2 have 4G and 3G RATs supported in common, and the available list of PLMNs will be the same for both 4G and 3G RATs, the same PLMN list can be shared with SIM2 by SIM1 to save time and battery power. After sharing the PLMN list with the SIM2, the UE determines that 2G RATs are yet to be scanned. Therefore, the UE uses the PLMN list acquired by the SIM1 for 4G and 3G RATs for SIM2, and performs RAT scanning only for 2G instead of scanning for 4G, 3G, and 2G RATs.

Figure 11:
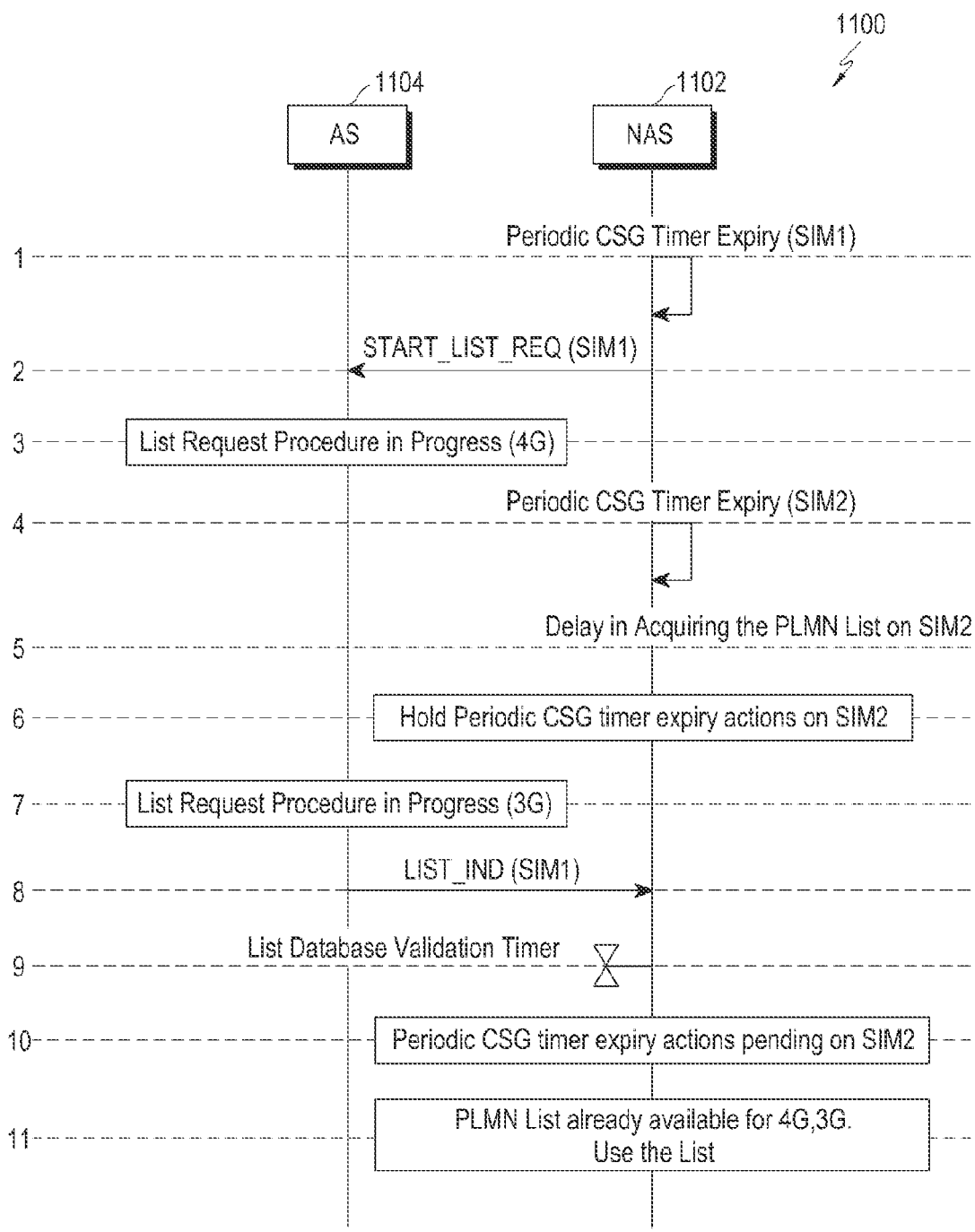
FIG. 11 is a flow diagram illustrating an example of a solution for a problem in a scenario of a list sharing procedure between two SIMs with single RF having 4G and 3G RATs in common, according to an embodiment of the present invention.

FIG. 11 is a flow diagram illustrating an example of a solution for a problem in a scenario of a list sharing procedure between two SIMs with single RF having 4G and 3G RATs in common, according to an embodiment of the present invention. FIG. 11 describes an interaction between NAS 1102 and AS 1104 in a multi-mode dual SIM UE that includes SIM1 and SIM2 for generation and acquisition of a PLMN list. Here, both SIM 1 and SIM2 acquire the PLMN list on 4G and 3G RATs in common. When a periodic CSG timer is expired at SIM1 of the UE, the CSG search is initiated to get the available list of CSG IDs along with the PLMNs on all supported 4G and 3G RATs by sending START_LIST_REQ to the AS 1104. The AS 1104 performs the scan procedure on the supported for 4G and 3G separately. While the PLMN list request procedure is in progress on SIM1, the RF will be used by the SIM1.

During this time, the PLMN list acquisition procedure needs to be started on SIM2 due to the event of periodic CSG timer expiration. But as the RF is still occupied by the SIM1, SIM2 needs to wait until the SIM1 releases the RF, thereby delaying acquiring of a PLMN list on SIM2. In another embodiment of the present invention, the other events for starting another PLMN list acquisition procedure may be a manual PLMN selection and HPLMN timer expiration.

Once the PLMN list is received on SIM1 of the UE, the UE creates a database as described in FIG. 7, which includes PLMN ID, CSG ID, HNBLen, HNBName, RAT ID, and Description, and starts a list validation timer each time the PLMN list is acquired as part of the CSG search from all the supported 4G and 3G RATs.

The PLMN list acquisition procedure is completed on SIM1, and the RF is released by the SIM1. Since both the SIM1 and the SIM2 have 4G and 3G RATs supported in common, and the available list of PLMNs will be the same for both 4G and 3G RATs, the same PLMN list can be shared with SIM2 by SIM1. The SIM 1 and SIM2 are using the same PLMN list for 4G and 3G RATs. The SIM2 uses the released RF and starts a list validation timer. As the PLMN list for 4G and 3G RATs are already acquired by the SIM2, the UE will not initiate another scan procedure for acquisition of PLMN list for 4G and 3G RATs, and thereby saves time and battery power.

The present invention has been described with reference to specific embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software, and/or any combination of hardware, firmware, and/or software embodied in a machine readable medium. For example, the various electrical structure and methods may be embodied using transistors, logic gates, and electrical circuits, such as application specific integrated circuits.

Although the embodiments herein are described with various embodiments, it will be obvious for a person skilled in the art to practice the present invention with modifications. It is also to be understood that the following claims are intended to cover all of the generic and specific features of the embodiments described herein and all the statements of the scope of the embodiments which as a matter of language might be said to fall there between. It will be understood by those skilled in the art that various changes in form and details may be made therein without departing from the spirit and scope of the present invention as defined by the appended claims and their equivalents.

What is claimed is:

1. A method of handling a Public Land Mobile Network (PLMN) selection in a mobile communication network, the method comprising:
    obtaining, by a User Equipment (UE), a PLMN list of one or more Radio Access Technologies (RATs) comprising a list of available PLMNs, when the UE performs a manual Closed Subscriber Group (CSG) selection;
    initiating a PLMN list validation timer; and
    reusing the previously obtained PLMN list, when at least one predefined event is triggered and the PLMN list validation timer is running,
    wherein the at least one predefined event comprises at least one of Home Public Land Mobile Network (HPLMN) timer expiration, a manual PLMN selection, and an autonomous CSG selection.

2. The method of claim 1, further comprising obtaining, by the UE, PLMN related information, wherein the PLMN related information comprises PLMN Identity (ID), CSG ID, Home Node B (HNB) Name, HNB length, and RAT information associated with each PLMN in the PLMN list.

3. The method of claim 2, wherein the PLMN related information indicates the UE to initiate one of:
    a manual CSG search;
    an autonomous CSG search;
    a manual PLMN search; and
    a high priority PLMN search.

4. The method of claim 1, further comprising:
    updating a RAT information table each time the PLMN list is acquired while the PLMN list validation timer is running.

5. The method of claim 4, wherein the RAT information table comprises PLMN ID, CSG ID, HNB length, HNB Name, a description of each cell type, and RAT information, for each PLMN in the PLMN list.

6. The method of claim 4, wherein the RAT information table is configurable and is stored in a non-volatile memory of the UE in accordance with a user selection and received information.

7. The method of claim 1, further comprising:
    maintaining, by the UE, a database comprising PLMN ID, CSG ID, HNB Name, HNB length and RAT information associated with each PLMN in the PLMN list.

8. The method of claim 1, the one or more RATs comprise at least one of a 4G and a 3G technology.

9. The method of claim 1, further comprising sharing the PLMN list with one or more Subscriber Identity Modules (SIMs) for commonly supported RATs.

10. A user equipment (UE) for use in a mobile communication network for an enhanced Public Land Mobile Network (PLMN) selection, the UE comprising:
    a memory storing a software application; and
    circuitry, which upon executing the software application, performs the following:
        obtain a PLMN list of one or more Radio Access Technologies (RATs) comprising a list of available PLMNs, when the UE performs a manual Closed Subscriber Group (CSG) selection;
        initiate a PLMN list validation timer; and
        reuse the previously obtained PLMN list, when at least one predefined event is triggered and the PLMN list validation timer is running,
    wherein the at least one predefined event comprises at least one of Home Public Land Mobile Network (HPLMN) timer expiration, a manual PLMN selection, and an autonomous CSG selection.

11. The UE of claim 10, wherein the circuitry further performs obtaining PLMN related information, and wherein the PLMN related information comprises PLMN IDentity (ID), CSG ID, Home Node B (HNB) Name, HNB length and RAT information associated with each PLMN in the PLMN list.

12. The UE of claim 11, wherein the PLMN related information indicates the UE to initiate one of:
    a manual CSG search;
    an autonomous CSG search;
    a manual PLMN search; and
    a high priority PLMN search.

13. The UE of claim 10, wherein the circuitry further performs updating a RAT information table each time the PLMN list is acquired while the PLMN list validation timer is running.

14. The UE of claim 13, wherein the RAT information table comprises PLMN ID, CSG ID, HNB length, HNB Name, a description of each cell type, and RAT information, for each PLMN in the PLMN list.

15. The UE of claim 13, wherein the RAT information table is configurable and is stored in a non-volatile memory of the UE in accordance with a user selection and received information.

16. The UE of claim 10, wherein the circuitry further performs maintaining a database comprising PLMN ID, CSG ID, HNB Name, HNB length, and RAT information associated with each PLMN in the PLMN list.

17. The UE of claim 10, wherein the one or more RATs comprise at least one of a 4G and a 3G technology.

18. The UE of claim 10, wherein the circuitry further performs sharing the PLMN list with one or more Subscriber Identity Modules (SIMs) for commonly supported RATs.

19. A non-transitory computer-readable medium storing processor-executable instructions, which upon being executed by a processor, perform the following:
obtaining a Public Land Mobile Network (PLMN) list of one or more Radio Access Technologies (RATs) comprising a list of available PLMNs, when a User Equipment (UE) performs a manual Closed Subscriber Group (CSG) selection;
initiating a PLMN list validation timer; and
reusing the previously obtained PLMN list, when at least one predefined event is triggered and the PLMN list validation timer is running,
wherein the at least one predefined event comprises at least one of Home Public Land Mobile Network (HPLMN) timer expiration, a manual PLMN selection, and an autonomous CSG selection.

20. The non-transitory computer-readable medium of claim 19, further comprising processor-executable instructions, which upon being executed perform the following:
updating a RAT information table each time when the PLMN list is acquired, while the PLMN list validity timer is running.

* * * * *